United States Patent
Dunphy et al.

(10) Patent No.: US 11,892,572 B1
(45) Date of Patent: Feb. 6, 2024

(54) SPATIAL LIGHT MODULATOR RETROREFLECTOR MITIGATION

(71) Applicant: Waymo LLC, Mountain View, CA (US)

(72) Inventors: James Dunphy, San Jose, CA (US); David Schleuning, Piedmont, CA (US); Ralph Shepard, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 537 days.

(21) Appl. No.: 17/138,079

(22) Filed: Dec. 30, 2020

(51) Int. Cl.
  *G02B 26/08* (2006.01)
  *G01S 7/497* (2006.01)
(52) U.S. Cl.
  CPC .......... G01S 7/497 (2013.01); G02B 26/0833 (2013.01)
(58) Field of Classification Search
  CPC ....... G01S 7/00; G01S 7/497; G02B 26/0833; F21S 41/675; F21S 41/16; F21S 41/00; F21S 41/365; F21S 41/645; F21S 41/125; F21S 41/14; F21S 41/176; F21S 41/635; F21S 41/36; F21S 41/141; F21S 41/663; F21S 41/683; F21S 41/692; F21S 41/60; F21S 41/65; F21S 43/00; F21S 41/12; F21S 41/13; F21S 41/18; F21S 41/32; F21S 41/39; F21S 45/70; F21S 8/003; F21S 41/285; F21S 41/321; F21Y 2115/30;

(Continued)

(56) References Cited

U.S. PATENT DOCUMENTS

| 8,228,582 B1 | 7/2012 | Pepper et al. |
| 8,436,748 B2 | 5/2013 | Mimeault et al. |

(Continued)

FOREIGN PATENT DOCUMENTS

| AT | 518724 B1 | * | 2/2018 | ............ B60Q 1/085 |
| CN | 108368983 A | * | 8/2018 | ............ F21S 41/14 |
| CN | 108382306 A | * | 8/2018 | |

OTHER PUBLICATIONS

Search English translation of CN-108382306-A (Year: 2018).*

(Continued)

*Primary Examiner* — Omar Rojas Cadima
(74) *Attorney, Agent, or Firm* — McDonnell Boehnen Hulbert & Berghoff LLP (57) ABSTRACT

The present disclosure relates to multi-channel optical transmitter modules, lidar systems, and methods that involve micromirror devices. An example optical transmitter module includes at least one light-emitter device and a plurality of micromirror devices optically-coupled to the at least one light-emitter device. The at least one light-emitter device is configured to emit respective light beams toward an environment via the micromirror devices. The micromirror devices are configured to deflect the light beams. The optical transmitter module also includes a controller having at least one processor and a memory. The controller is configured to carry out operations. The operations include receiving information indicative of a retroreflector object in the environment. The operations include, based on the received information, causing at least one micromirror device of the plurality of micromirror devices to deflect at least one light beam so that the at least one light beam does not interact with the retroreflector object.

20 Claims, 9 Drawing Sheets

(58) Field of Classification Search
CPC .............. F21Y 2115/10; F21Y 2113/13; F21Y 2101/00; F21K 9/64; F21K 9/60; F21K 9/65; F21W 2102/20; F21W 2102/00; F21W 2102/145; F21W 2107/10; F21W 2131/406; F21W 2103/60

See application file for complete search history.

(56) References Cited

U.S. PATENT DOCUMENTS

| | | | |
|---|---|---|---|
| 9,557,473 | B2 | 1/2017 | Nichol et al. |
| 10,527,725 | B2 | 1/2020 | Pacala et al. |
| 10,613,203 | B1 | 4/2020 | Rekow et al. |
| 10,663,586 | B2 | 5/2020 | Pacala et al. |
| 10,732,032 | B2 | 8/2020 | Pacala et al. |
| 2008/0130302 | A1* | 6/2008 | Watanabe .............. B60Q 1/085 362/466 |
| 2015/0160454 | A1* | 6/2015 | Bhakta ............... G02B 26/0833 362/513 |
| 2015/0377446 | A1* | 12/2015 | Bhakta ................... F21S 41/16 362/510 |
| 2016/0377252 | A1* | 12/2016 | Bhakta ................. F21V 23/003 362/520 |
| 2018/0007343 | A1 | 1/2018 | Send et al. |
| 2018/0252513 | A1 | 9/2018 | Takashima |
| 2018/0284237 | A1 | 10/2018 | Campbell et al. |
| 2019/0063914 | A1 | 2/2019 | Mayer et al. |
| 2020/0041613 | A1 | 2/2020 | Pacala et al. |
| 2020/0096639 | A1 | 3/2020 | Panas et al. |
| 2020/0141716 | A1 | 5/2020 | Droz et al. |
| 2020/0221068 | A1 | 7/2020 | Schmidt et al. |
| 2020/0341147 | A1 | 10/2020 | Dussan et al. |

OTHER PUBLICATIONS

Search English translation of CN 108368983 A (Year: 2018).*
Search English translation of AT 518724 B1 (Year: 2018).*
He et al., "Freeform lens design to eliminate retroreflection for optical systems," Applied Optics, Feb. 10, 2018, pp. 1218-1224, vol. 57, No. 5.
Mieremet et al., "Retroreflection reduction by masking apertures," Optical Engineering, Apr. 2010, pp. 043202-1-043202-11, vol. 49, No. 4.

* cited by examiner

SPATIAL LIGHT MODULATOR RETROREFLECTOR MITIGATION

BACKGROUND

Lidar sensor performance can be negatively impacted by retroreflectors in an environment of the lidar sensor. Retroreflectors can be formed from highly reflective materials, and may include roadsigns, traffic signals, and/or smooth metallic surfaces. For example, in retroreflector scenarios, a high proportion of photons from emitted light pulses can be reflected directly back to the receiver module of the lidar. Due to the amount of light returned to the receiver module, crosstalk paths in the transmitter, receiver, or lens elements may allow at least some light to leak into nearby channels. Such optical crosstalk may cause spurious points in the point cloud and/or cause noise that may make it more difficult to distinguish real lidar signals.

Conventional lidars may mitigate retroreflectors via various approaches: 1) some lidars may include a single transmit/receive channel that may provide only one shot (e.g., light pulse) in the air at one time; 2) a shot delay time and/or dither time may be predetermined so that specific shots can be disambiguated from spurious reflections; and 3) some lidars may actively disable one or more transmitter channels when such transmitter channels are pointed at known retroreflector objects. In such scenarios, the retroreflector object can be detected and the corresponding transmitter channels can be disabled temporarily until they point away from the retroreflector object.

For lidar systems that provide multiple light pulses "in the air" at the same time, implementing mitigation approaches 2) or 3) may utilize independent pulse driving circuits for each laser Tx channel. However, this approach may be impractical for compact shorter range lidars, which may not have suitable space for many lasers and respective transmitter hardware and channels. Accordingly, other, improved approaches to mitigate the effect of retroreflector objects in lidar systems are desired.

SUMMARY

The present disclosure relates to an optical transmitter portion of a lidar system that includes a plurality of micromirror devices configured to deflect emission light provided by the optical transmitter module. In some examples, such embodiments could include lidar systems configured to be utilized with self-driving vehicles.

In a first aspect, an optical transmitter module is provided. The optical transmitter module includes at least one light-emitter device and a plurality of micromirror devices optically-coupled to the at least one light-emitter device. The at least one light-emitter device is configured to emit respective light beams toward an environment via the micromirror devices. The micromirror devices are configured to deflect the light beams. The optical transmitter module also includes a controller having at least one processor and a memory. The controller executes program instructions stored in the memory so as to carry out operations. The operations include receiving information indicative of a retroreflector object in the environment. The operations also include, based on the received information, causing at least one micromirror device of the plurality of micromirror devices to deflect at least one light beam so that the at least one light beam does not interact with the retroreflector object.

In a second aspect, a lidar system is provided. The lidar system includes an optical transmitter module. The optical transmitter module includes a plurality of light-emitter devices and a plurality of micromirror devices that are optically-coupled to the light-emitter devices. The light-emitter devices are configured to emit respective light beams toward an environment via the micromirror devices. The micromirror devices are configured to deflect the light beams. The lidar system also includes an optical receiver module. The optical receiver module also includes a plurality of detector devices and a controller having at least one processor and a memory. The controller executes program instructions stored in the memory so as to carry out operations. The operations include causing at least one micromirror device of the plurality of micromirror devices to deflect at least a portion of at least one light beam.

In a third aspect, a method is provided. The method includes causing a light-emitter device to emit a light beam toward an environment via a micromirror device. The micromirror device is configured to deflect the light beam. The method also includes receiving information indicative of a retroreflector object in the environment. The method yet further includes based on the received information, causing the micromirror device to deflect the light beam so that the light beam does not interact with the retroreflector object.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure describes a multi-channel optical transmitter module, lidar systems, and/or methods that involve a spatial light modulator (SLM). In such scenarios, the SLM may be utilized to disable or attenuate the transmit light of one or more optical channels independently. In such an approach, the SLM may be disposed at an image plane of a transmit lens. Furthermore, the SLM may include one or more SLM pixels, each of which may correspond to a respective transmit channel. One or more laser sources could be disposed to illuminate each SLM pixel. In cases where light pulses from respective light sources are spatially confined to respective SLM pixels, various retroreflector mitigation techniques may be applied by using the SLM to modulate the light pulses in a temporal dithering or switching manner.

Many SLMs technologies are available, but some may limit switching speed and/or on/off contrast ratio. Within the context of the present disclosure, the switching speed could be configured to be less than the maximum time that can be allocated to acquire detector signals that correspond to each pixel along a 1-dimensional line of SLM pixels. As an example, the switching speed could be in the 10-200 μsec range. Longer or shorter switching speeds are contemplated and possible. The contrast ratio could be configured to adequately attenuate retroreflector objects (e.g., at least 30 dB). Possible SLM technologies include LCOS (liquid crystal on silicon, ferroelectric or nematic), micro LCD, grating light valves, AOMs (acousto-optic modulators), and micromirrors. In some examples, Texas Instruments Digital Micromirror (DLP) technology may provide a good combination of cost, speed, and contrast ratio.

In operation, retroreflector objects can be detected either in the previously collected line (e.g., based on proximity) or in a separately allocated detection shot period (e.g., a low power light pulse emission cycle). A controller may be utilized to adjust the SLM pixels to attenuate the incident light beam, e.g., (<10 dB) or turn it off altogether, e.g., (<30 dB). Once the SLM has responded, the lidar is operated to collect data about the environment being instrumented with reduced interference from retroreflector objects. In some embodiments, the controller may be implemented in an FPGA and/or an ASIC.

In various embodiments, a 1-dimensional array of light sources could be optically coupled to a 1-dimensional SLM pixel array. The transmitter module could be mechanically rotated or pivoted about a first axis so as to sweep the one or more light beams in an azimuthal range (e.g., 90 degrees, 180 degrees, 270 degrees, or 360 degrees about the first axis). Additionally or alternatively, examples could include a 2-dimensional array of light sources that are optically coupled to a 2-dimensional SLM pixel array. It will be understood that other arrangements of the elements of the optical system are possible and contemplated.

An optical system could include a base, a portion configured to rotate or pivot about a first axis, and an optical housing. In various embodiments, the optical system could be a lidar system. In such scenarios, the portion could include one or more light-emitter devices and a one or more detector devices configured to obtain information about the external environment. In some embodiments, the light-emitter device(s) and/or the detector device(s) could be disposed along a substrate that is parallel to the first axis. By rotating or pivoting the portion about the first axis, different information about the external environment could be obtained.

In some embodiments, the optical system could include one or more digital micromirror devices (DMDs) that could be configured to interact with emission light emitted by the light-emitter devices so as to adjust a beam direction, beam width, beam shape, and/or other aspect of the emission light being emitted from the optical system. DMDs could include microoptoelectromechanical system (MOEMS) devices. As an example, the DMDs could be configured to reflect at least a first portion of the emission light toward the external environment while also reflecting a second portion of the emission light toward a beam dump or another location.

In various examples, emission light emitted by the light-emitter devices could have an initial beam diameter, beam waist, and/or beam shape. When the emission light interacts with the DMDs, the DMDs could be controlled/adjusted so that a portion of the emission light reflected toward the external environment has a smaller beam diameter and/or different beam shape as compared to the initial beam diameter/beam shape. In scenarios where the detector devices have a detection area that is larger than the smaller beam diameter, the DMDs could be adjustably controlled so as to achieve super-resolution imaging of the external environment.

In example embodiments, the DMDs could be controlled based on determining one or more strongly reflective objects or retroreflectors. In such scenarios, when a retroreflector is identified, the DMDs could be controlled so as to reduce or minimize the amount of reflected light transmitted from the optical system toward the retroreflectors. Reducing the light transmitted toward the retroreflectors could improve optical system performance by reducing the likelihood of "blinding" the lidar sensor. In some embodiments, the DMDs could be controlled at kHz refresh rates, although other refresh rates are possible and contemplated.

In some examples, the DMDs could be disposed along a one-dimensional line that is parallel to the first axis. In such a scenario, a plurality of DMDs could be associated with each light-emitter device. Other physical arrangements and groupings of DMDs are contemplated.

II. Example Optical Transmitter Modules

Figure 1:
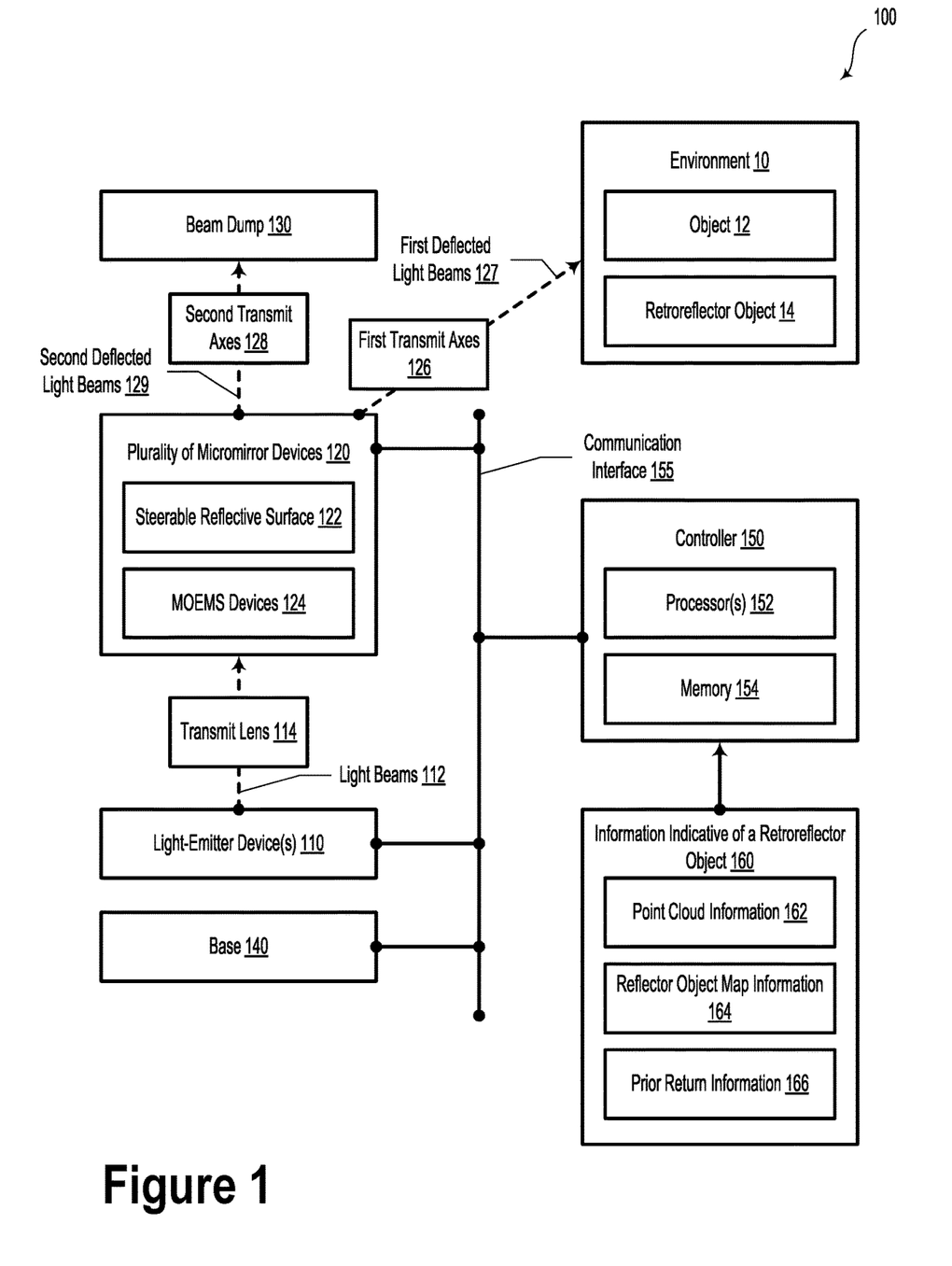
FIG. 1 illustrates an optical transmitter module, according to an example embodiment.

FIG. 1 illustrates an optical transmitter module 100, according to an example embodiment. Optical transmitter module 100 could include a portion of a lidar system configured to emit light pulses and direct them towards objects 12 in a scene. In specific embodiments, the optical transmitter module 100 could help provide lidar functionality for a self-driving vehicle, a robot, or another type of vehicle configured to navigate its environment 10.

The optical transmitter module 100 includes at least one light-emitter device 110. In some embodiments, the at least one light-emitter device 110 could include laser diode devices configured to emit light with wavelength around 905 nm. It will be understood that other wavelengths are possible and contemplated.

The optical transmitter module 100 also includes a plurality of micromirror devices 120 that are optically-coupled to the at least one light-emitter device 110. In some examples, the at least one light-emitter device 110 is configured to emit respective light beams 112 toward an environment 10 via the micromirror devices 120. In such scenarios, the micromirror devices 120 are configured to deflect the light beams 112 toward the environment along respective first transmit axes 126.

In various embodiments, the micromirror devices 120 could include microoptoelectromechanical system (MOEMS) devices. In some examples, micromirror devices 120 could be disposed at an image plane of a transmit lens 114 that is optically-coupled to the light-emitter devices 110.

In some example embodiments, each of the micromirror devices 120 could include a steerable reflective surface 122 configured to dynamically reduce or minimize light that interacts with the retroreflector object 14. In some examples, the steerable reflective surface 122 could be formed from aluminum or another reflective material, such as another metal. The steerable reflective surface 122 could have a rectangular or square shape and could be between 10-30 micrometers along a side. The steerable reflective surface 122 could be mounted to a yoke 232 configured to serve as a hinge about which the steerable reflective surface 122 could turn. In some embodiments, an angle of the steerable reflective surface 122 could be adjusted by way of electrostatic attraction. Furthermore, the micromirror devices 120 can be individually addressed so that each micromirror device 120 could be maintained at respective, controllable angles.

The optical transmitter module 100 additionally includes a controller 150 having at least one processor 152 and a memory 154. In some embodiments, the controller 150 could be communicatively coupled (e.g., wirelessly or wired) to various elements of optical transmitter module 100 by way of communication interface 155. For example, the controller 150 could be communicatively coupled to the plurality of light-emitter devices 110, the driver circuitry, the micromirror devices 120, and/or other elements described herein in a wired or wireless manner by way of the communication interface 155.

In such scenarios, the controller 150 executes program instructions stored in the memory 154 so as to carry out operations. The operations include receiving information indicative of a retroreflector object 14 in the environment 10. In various examples, receiving information indicative of a retroreflector object 14 in the environment 10 could include receiving at least one of: point cloud information 162, retroreflector object map information 164, or prior return information 166.

In some embodiments, the point cloud information 162 could include information indicative of a plurality of points in specific locations in space. As an example, the point cloud information 162 could indicate the location of objects 12 in the environment 10.

In various examples, retroreflector object map information 164 could include information indicative of spatial locations of highly reflective objects within the environment 10. Highly reflective objects could include, without limitation, smooth mirror-like surfaces, glass, polished metal, corner cubes, among other possibilities.

Figure 4:
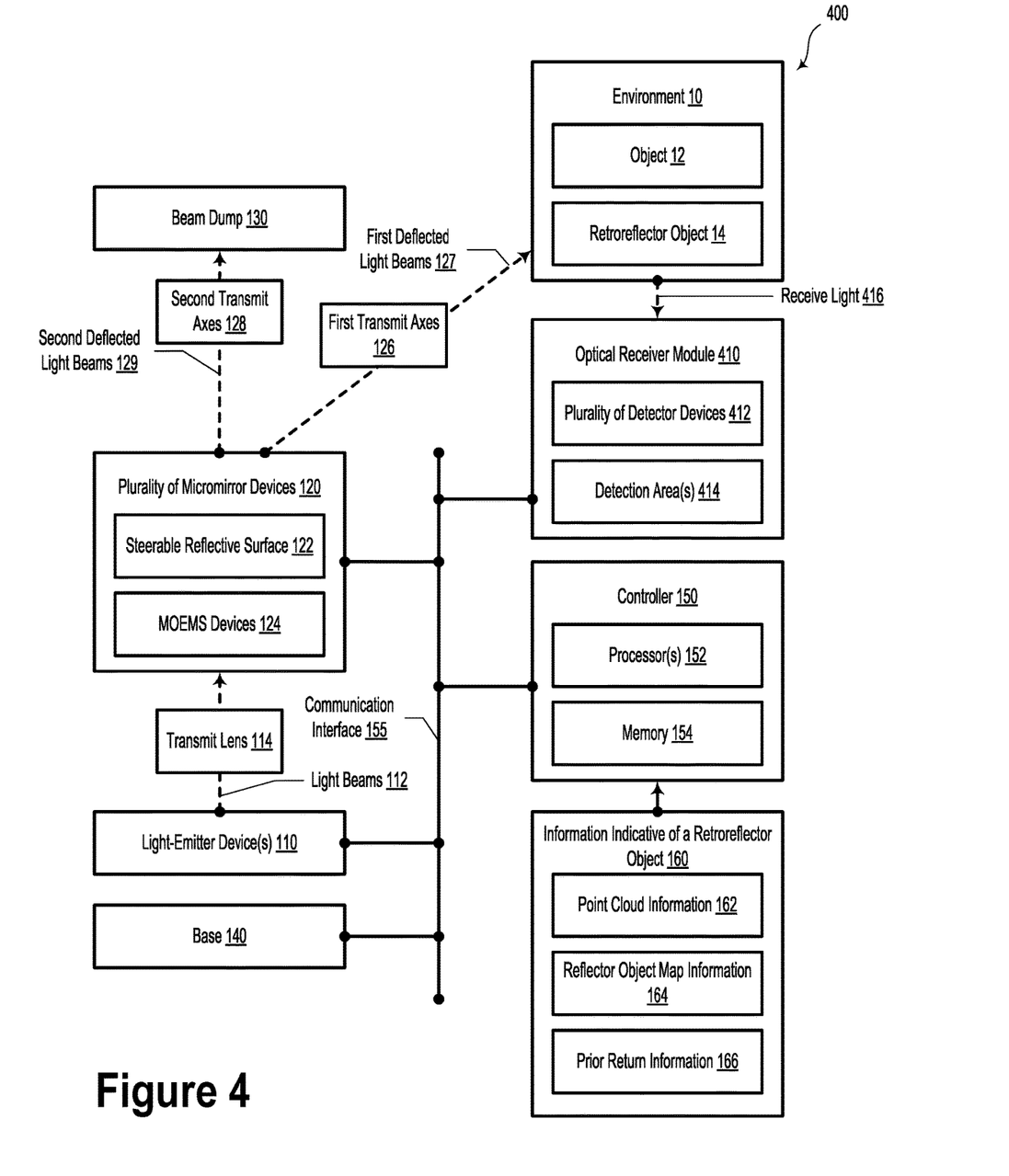
FIG. 4 illustrates a lidar system, according to an example embodiment.
Figure 5A:
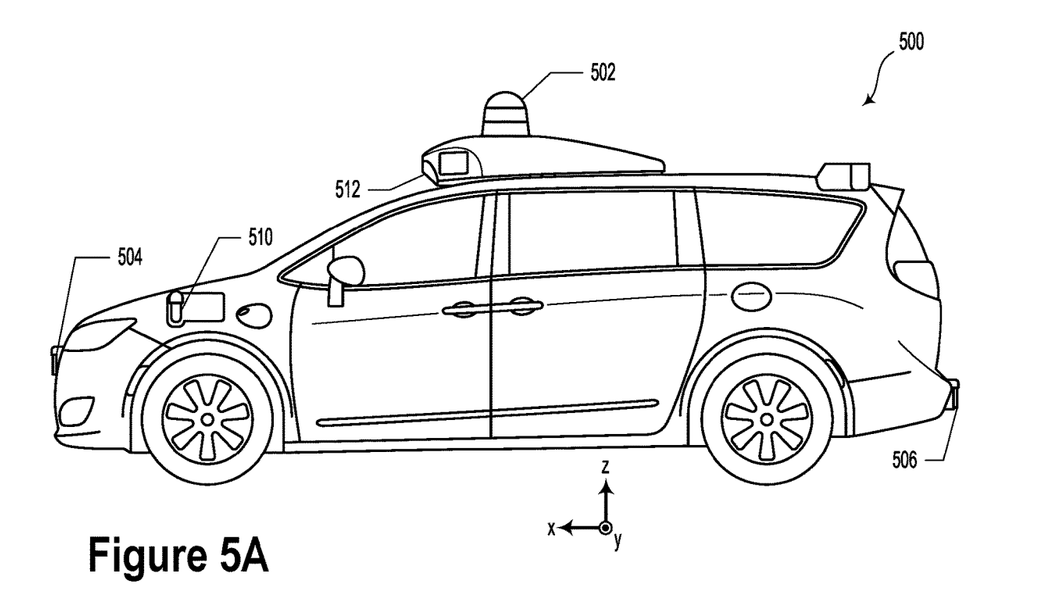
FIG. 5A illustrates a vehicle, according to an example embodiment.
Figure 5B:
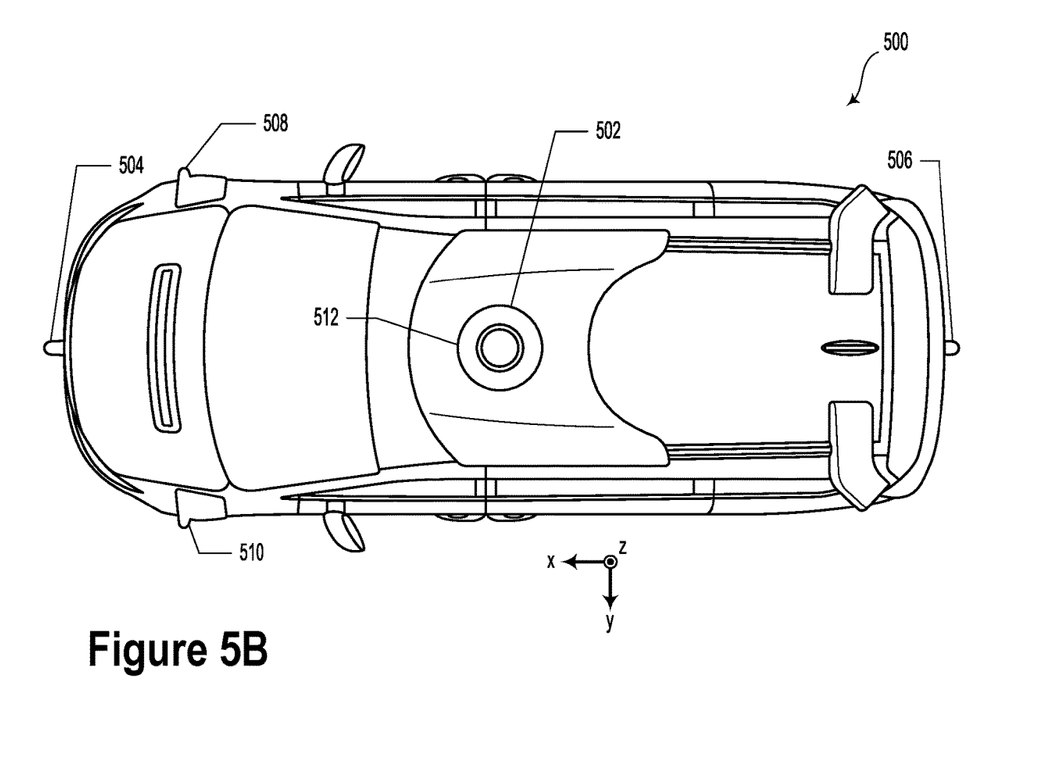
FIG. 5B illustrates a vehicle, according to an example embodiment.
Figure 5C:
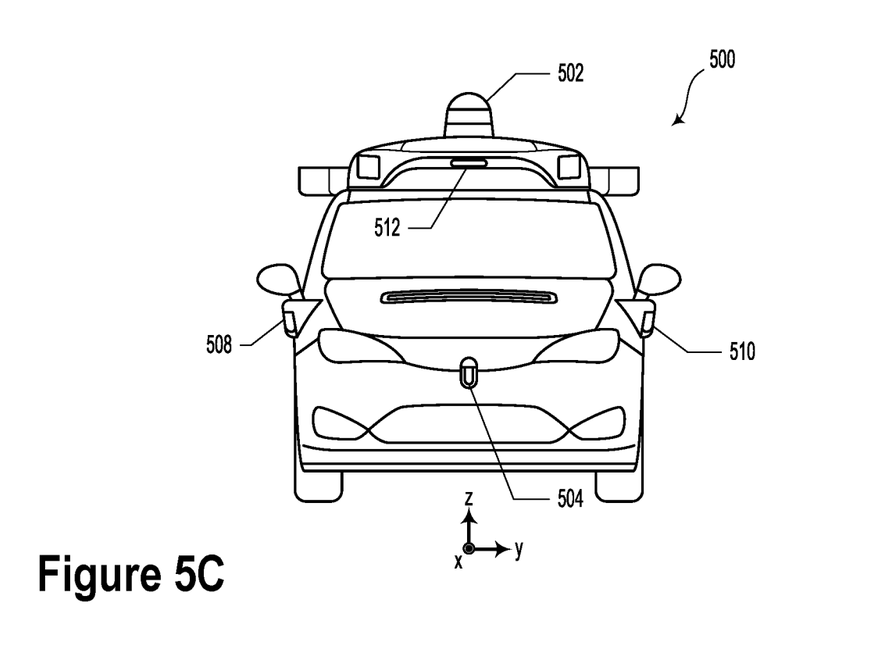
FIG. 5C illustrates a vehicle, according to an example embodiment.
Figure 5D:
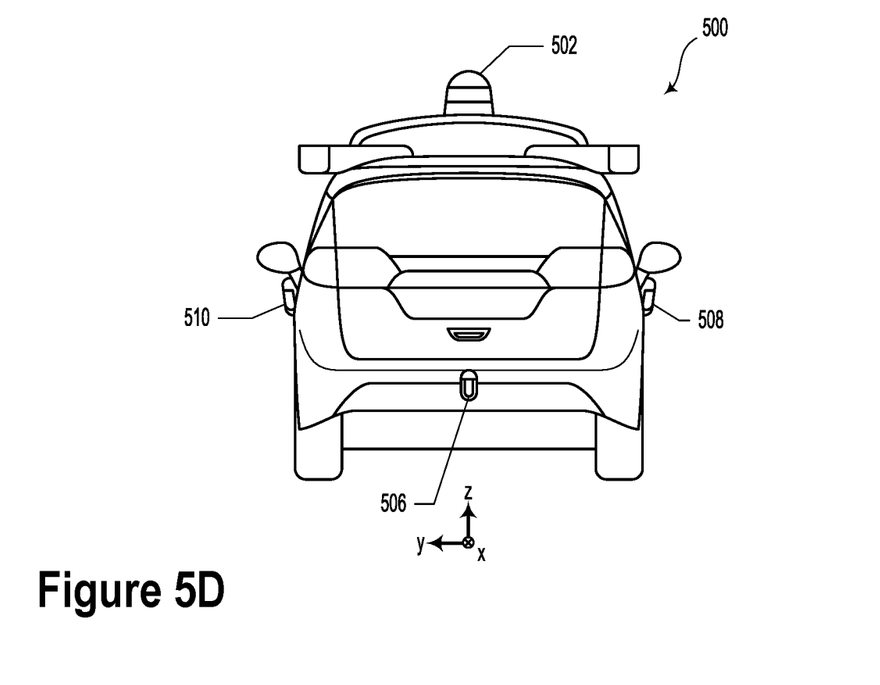
FIG. 5D illustrates a vehicle, according to an example embodiment.
Figure 5E:
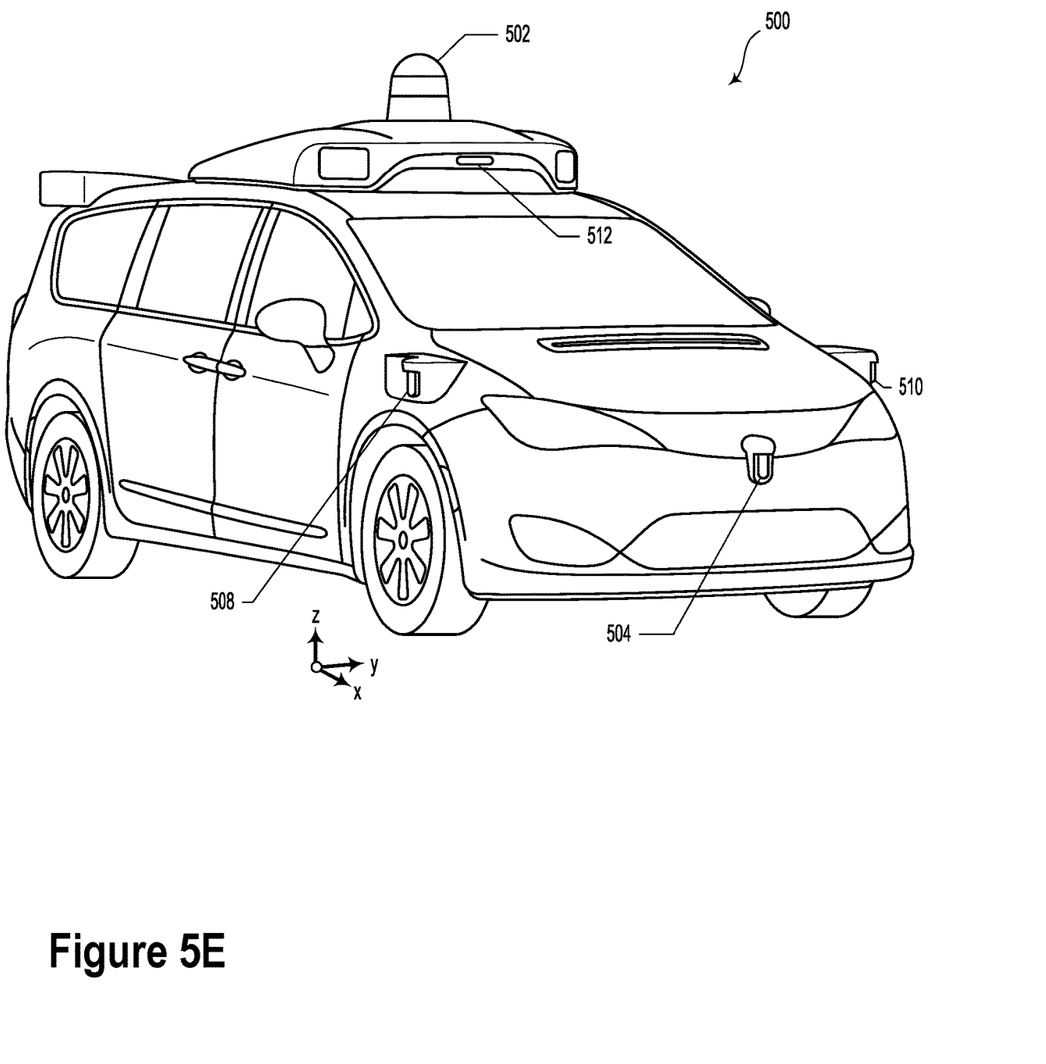
FIG. 5E illustrates a vehicle, according to an example embodiment.

Prior return information 166 could include information about objects and retroreflectors in the environment obtained from prior lidar scans. Such prior return information 166 could include lidar point cloud information from a prior lidar scan. The prior lidar scan could have been conducted at a prior time by the same lidar system (e.g., sensor system 400 as illustrated in FIG. 4) or a different lidar system.

The operations also include, based on the received information, causing at least one micromirror device of the plurality of micromirror devices 120 to deflect at least a portion of one light beam from first transmit axis 126 to second transmit axis 128 so that the portion of at least one light beam does to not interact with the retroreflector object 14. As an example, the at least one micromirror device could be configured to divert 50%, 75%, 90%, or 100% of the photon flux associated with the light beam along the second transmit axis 128. In various examples, the operation of causing the at least one micromirror device of the plurality of micromirror devices 120 to deflect the at least one light beam 112 includes deflecting the at least one light beam 112 toward a beam dump 130.

In some examples, the optical transmitter module 100 may also include a base 140 configured to rotate or pivot about a first axis so as to sweep respective transmit axes about an azimuth range. In such scenarios, the optical transmitter module 100 could be configured to illuminate a plurality of vertical pixel lines arranged about the first axis.

In example embodiments, the plurality of micromirror devices 120 could be configured to operate at a periodic refresh rate. In such scenarios, the refresh rate could be greater than 1 kHz. As an example, the switching speed could be in the 10-200 μsec range, corresponding to between 5 kHz and 100 kHz. Other refresh rates, switching speeds, and/or periodicities are possible and contemplated.

In some embodiments, the optical transmitter module 100 could also include a transmit lens 114. In such scenarios, the plurality of micromirror devices 120 are arranged in a 1-dimensional array. As an example, the respective micromirror devices 120 could be disposed along a shared micromirror axis. For example, the transmit lens 114 could be configured to focus the respective light beams along a portion of the shared micromirror axis.

In some examples, the optical transmitter module 100 additionally includes driver circuitry that is electrically-coupled to the plurality of light-emitter devices 110. The driver circuitry could include a field-effect transistor (FET) based pulsed laser diode driver. In such scenarios, the driver circuitry could be operable to provide a voltage and/or current pulse to the light-emitter devices 110 so as to cause the light-emitter devices 110 to emit one or more light pulses.

In various examples, the optical transmitter module 100 could include a transparent substrate. The transparent substrate could be formed from silica glass, polycarbonate, or another optically transparent material. In some embodiments, the transparent substrate could include a square or rectangular glass plate.

In various examples, the optical transmitter module 100 could additionally include a fast axis collimation lens disposed along the transparent substrate. The fast axis collimation lens could be configured to collimate the light pulses from the light-emitter devices 110 so as to provide collimated light. The fast axis collimation lens could include an optical fiber or another type of cylindrical lens.

In example embodiments, the optical transmitter module 100 could also include a plurality of waveguide structures disposed along the transparent substrate. The waveguide structures could include respective reflective surfaces. The waveguide structures are configured to optically guide the collimated light toward the respective reflective surfaces so as to provide transmit light to an environment 10.

Figure 7:
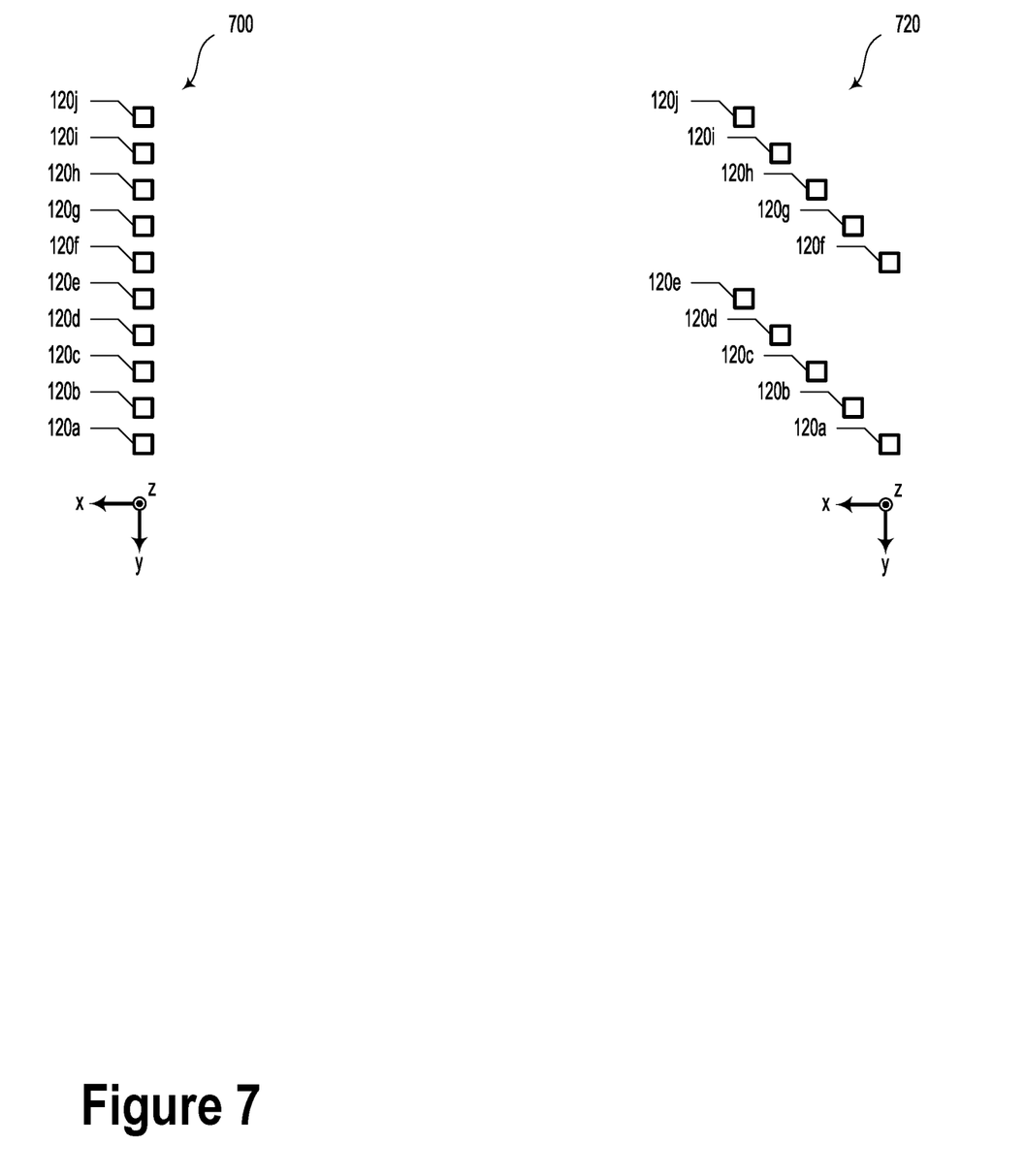
FIG. 7 illustrates various arrangements of micromirrors, according to example embodiments.

FIG. 7 illustrates various arrangements of micromirrors, according to example embodiments. 1-dimensional array 700 could include a linear arrangement of micromirrors 120a-120j. In such a scenario, the micromirrors 120a-120j could be disposed along an axis (e.g., the y-axis). Additionally or alternatively, the micromirror devices 120 could be arranged in other geometries or shapes. For example, as illustrated in FIG. 7, sparse array 720 could include an array of micromirrors 120a-120j disposed along two axes (e.g., x-axis and y-axis). In such scenarios, a 1-dimensional array of micromirror devices could be additionally spread out along a second dimension to reduce optical crosstalk by further separating nearest neighbor channels. In some embodiments, the geometry of the micromirror devices 120 could be similar to that of the plurality of light-emitter devices 110 as well as that of the plurality of detector devices 412, as illustrated in FIG. 4. In other words, in the case that the micromirror devices 120 are arranged in a sparse array 720, the respective light-emitter devices 110 and the respective detector devices 412 may also be arranged in a similar sparse array geometry. In some embodiments, the 2-dimensional sparse array 720 could be formed by interleaving a plurality of 1-dimensional arrays to maximize the density of micromirror devices/light-emitters devices.

Figure 2:
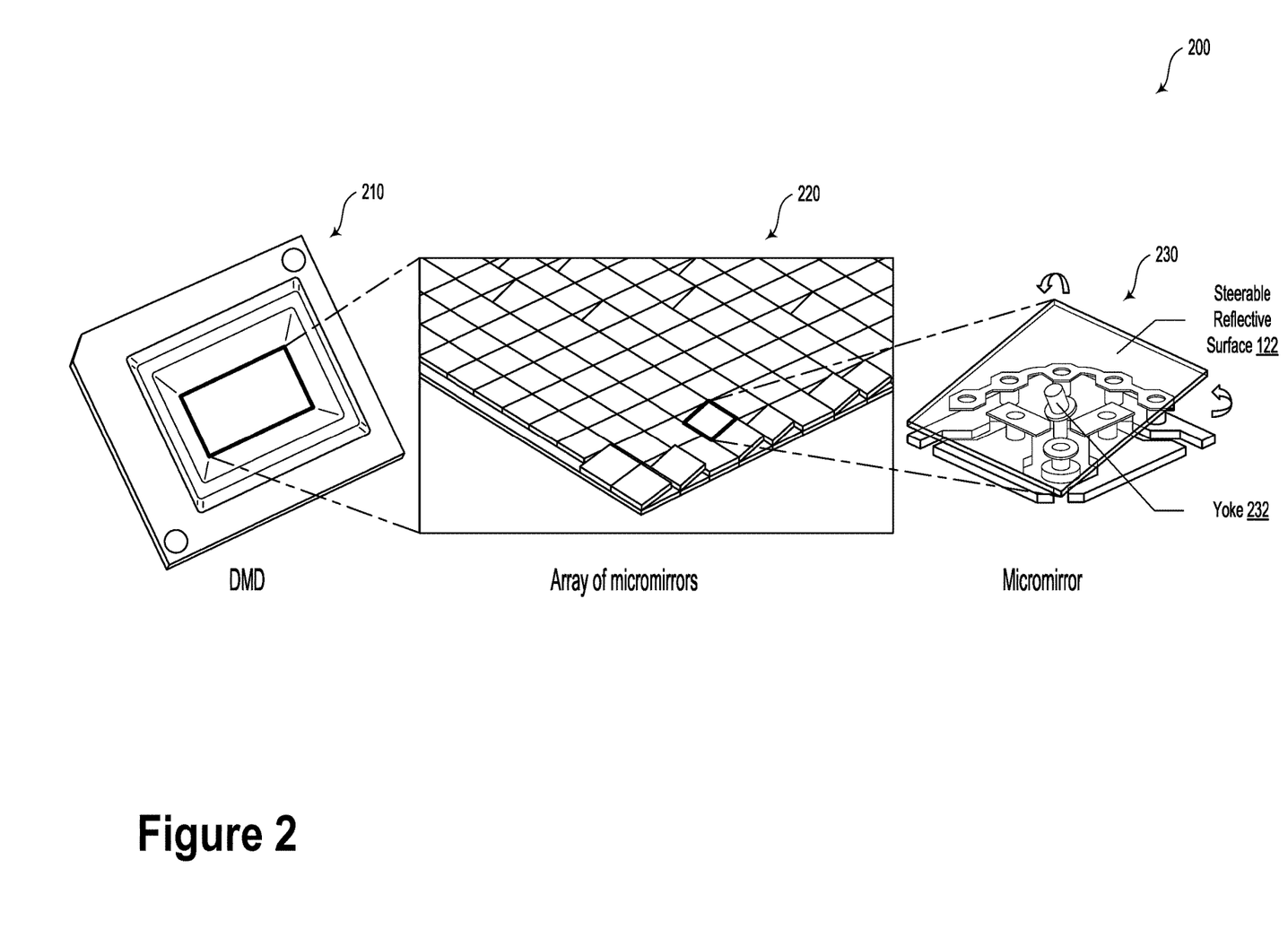
FIG. 2 illustrates a plurality of micromirrors, according to an example embodiment.

FIG. 2 illustrates various views of a plurality of micromirrors 200, according to an example embodiment. As shown, the views include a digital micromirror device (DMD) 210, an array of micromirrors 220, and an individual micromirror 230.

In an example embodiment, the DMD 210 could include several thousand or over a million microscopic mirrors arranged in the array of micromirrors 220. In some examples, the DMD 210 could be MEMS or MOEMS devices that are monolithically integrated with micromirror driver circuitry, such as static random access memory (SRAM) cells and/or other types of driver circuitry.

The array of micromirrors 220 could be disposed in a rectangular or square shape. However, other shapes and/or other arrangements are possible and contemplated.

As illustrated in FIG. 2, the individual micromirrors 230 could be configured to rotate the steerable reflective surface 122 within a rotational angle range of between ±5°, ±10°, ±15° or more. The micromirrors 230 could be configured to rotate based on an "on" or "off" signal that could be applied by a micromirror driver (not illustrated) configured to adjust the rotational angle range. When rotated so as to direct light beams along first transmit axes 126, the transmitted light could interact with objects 12 in the environment 10. Alternatively, when the micromirror 230 is rotated so as to direct light beams along second transmit axes 128, the light could be directed toward a beam dump 130 or heat sink.

Figure 3:
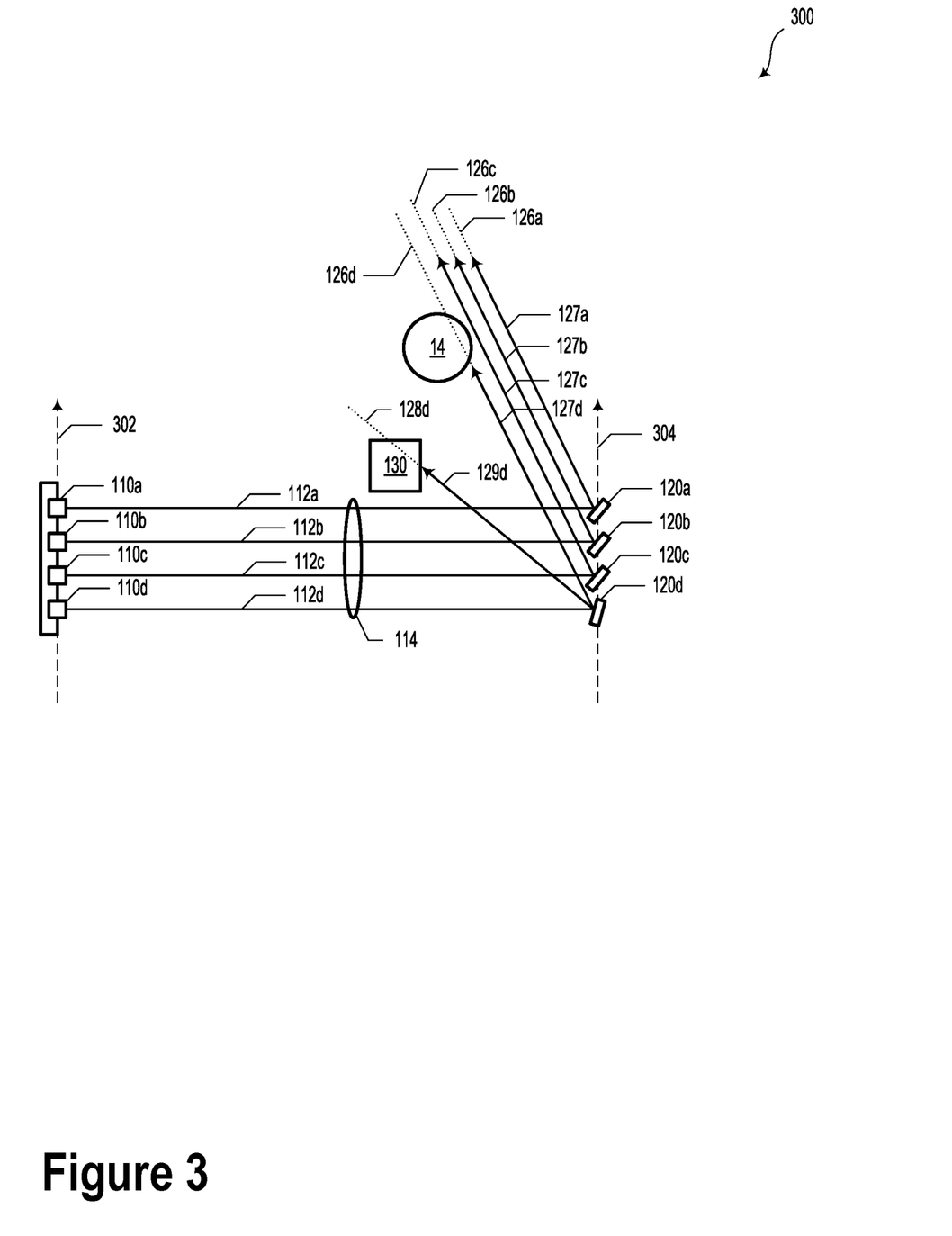
FIG. 3 illustrates an operating scenario involving the optical transmitter module of FIG. 1, according to an example embodiment.

FIG. 3 illustrates an operating scenario 300 involving the optical transmitter module 100 of FIG. 1, according to an example embodiment. In some examples, light-emitter devices 110a, 110b, 110c, and 110d could be arranged in a 1-dimensional array. In such scenarios, the light-emitter devices 110a, 110b, 110c, and 110d could be disposed along a shared light-emitter axis 302, as shown in FIG. 3.

In some examples, the plurality of micromirror devices 120a, 120b, 120c, and 120d are arranged in a 1-dimensional array. In such scenarios, the micromirror devices 120a, 120b, 120c, and 120d could be disposed along a shared micromirror axis 304, as shown in FIG. 3.

In various embodiments, the shared light-emitter axis 302 and the shared micromirror axis 304 could be parallel. However, it will be understood that other arrangements or geometries of various elements of the optical transmitter module 100 are possible and contemplated.

As illustrated in FIG. 3, the plurality of light-emitter devices 110a, 110b, 110c, and 110d could be configured to emit respective light beams 112a, 112b, 112c, and 112d toward transmit lens 114 so as to interact with the micromirror devices 120a, 120b, 120c, and 120d. Initially, the micromirror devices 120a, 120b, 120c, and 120d could direct first deflected light beams 127a, 127b, 127c, and 127d along first transmit axes 126a, 126b, 126c, and 126d. In such a scenario, at least one of the first deflected light beams (e.g., first deflected light beam 127d) could interact with a retroreflector object 14. Such an interaction could result in a high intensity return light pulse and could cause temporary detector device blooming or blindness, which may limit the performance of the lidar system (e.g., sensor system 400). As an example, light received by an optical channel that corresponds to a far-field retroreflector object may scatter or leak into adjacent receiver channels and could blind corresponding neighbor detector devices. In some embodiments, retroreflector issues can occur more frequently in cases of poor weather (e.g., raindrop or snow scattering). Additionally or alternatively, such issues may be exacerbated due to a lens element or another outer optical surface being contaminated by dirt, dust, and/or water.

In response to interactions with the retroreflector object 14, at least one of the micromirror devices (e.g., micromirror device 120d) could be controlled (e.g., by way of controller 150) to adjust in angle so as to direct a second deflected light beam 129d along second transmit axis 128d such that the second deflected light beam 129d interacts with the beam dump 130. In such scenarios, by redirecting the light beam so as to avoid retroreflector objects, a lidar system may avoid performance degradation due to received light that efficiently reflects off of retroreflectors.

In some examples, retroreflector objects 14 could be detected either in a previously collected line (e.g., based on proximity) or in a separately allocated detection shot period (e.g., a low power light pulse emission cycle). In some examples, the controller 150 could adjust the micromirror devices to attenuate the transmitted light beam, e.g., (<10 dB) or turn the light beam "off" altogether, e.g., (<30 dB). Once the micromirror has responded, the lidar can be operated to collect point cloud data with reduced interference from retroreflector objects.

III. Example Sensor Systems

FIG. 4 illustrates a sensor system 400, according to an example embodiment. Sensor system 400 includes an optical transmitter module (e.g., optical transmitter module 100) that includes a plurality of light-emitter devices (e.g., light-emitter devices 110). The light-emitter devices could be configured to emit light pulses.

In some examples, the optical transmitter module could also include driver circuitry electrically-coupled to the light-emitter devices. In such scenarios, the driver circuitry could be configured to provide voltage and/or current pulses that may cause the light-emitter devices to emit the light pulses.

In some examples, the optical transmitter module could also include a fast axis collimation lens that is disposed along a surface of a transparent substrate. The fast axis collimation lens is configured to collimate the light pulses so as to provide collimated light.

Additionally, the optical transmitter module could include a plurality of waveguide structures that could be disposed along the surface of the transparent substrate. The waveguide structures include respective reflective surfaces. The waveguide structures are configured to optically guide the collimated light toward the respective reflective surfaces so as to provide transmit light to the environment.

The optical transmitter module also includes a plurality of micromirror devices (e.g., micromirror devices 120) optically-coupled to the light-emitter devices. The light-emitter devices are configured to emit respective light beams (e.g., light beams 112) toward an environment (e.g., environment 10) via the micromirror devices. The micromirror devices are configured to deflect the light beams.

The sensor system 400 also includes an optical receiver module 410. The optical receiver module 410 includes a plurality of detector devices 412. In various embodiments, at least a portion of the plurality of detector devices 412 could include silicon photomultiplier (SiPM) devices. Other types of photodetector devices are possible and contemplated. As a non-limiting example, detector devices 412 could each include one or more semiconductor junctions (e.g., a p-n junction photodiode) configured to detect photons and responsively generate electrical charges and electrical current. In some examples, detector devices 412 could be disposed in a two-dimensional array (e.g., a rectangular or square array of detector elements). It will be understood that other arrangements of detector devices 412 are considered and possible. In some embodiments, the detector devices 412 could include an active-pixel sensor (APS) or a smart sensor. The smart sensor could combine the functionality of an image sensor and image processor in the same integrated circuit. In various embodiments, the smart sensor could include one or more processors in the same integrated circuit package. In some embodiments, the detector devices 412 could include a passive-pixel sensor (PPS). In alternative examples, the detector devices 412 could include a charge coupled device (CCD) image sensor or a complementary metal oxide semiconductor (CMOS) image sensor. In some embodiments, the micromirror devices 120 could be configured to deflect the at least one light beam 112 toward a neighboring receive channel and corresponding detector device (e.g., detector device 412). In other examples, the micromirror devices 120 could be configured to deflect the at least one light beam 112 towards a beam dump 130.

While some embodiments described herein may relate to "bi-static" lidar systems (e.g., lidar systems with separated transmit/receive optics and/or optical paths), it will be understood that "mono-static" lidar systems (e.g., lidar systems with shared transmit/receive optics and/or optical path) are also possible and contemplated.

The sensor system 400 additionally includes a controller 150 having at least one processor 152 and a memory 154. The controller 150 executes program instructions stored in the memory so as to carry out operations. The operations could include causing the driver circuitry to generate a plurality of current pulses so as to cause the light-emitter devices to emit light pulses and provide transmit light into an environment (e.g., environment 10).

Optionally, the operations could include receiving, from the optical receiver module, information indicative of a retroreflector object (e.g., retroreflector object 14) in the environment. In such scenarios, the operations also include causing at least one micromirror device to deflect at least a portion of the at least one light beam based on the received information. In such scenarios, at least one light beam is deflected so that it does not interact with the retroreflector object.

The operations may include receiving, from the detector devices 412, receive light 416, which could include information indicative of the environment. In some examples, the operations may further include determining, based on the received light, information indicative of objects (object 12) in the environment.

In some examples, the operations could include causing the at least one micromirror device to deflect at least a portion of the at least one light beam to adjust a beam diameter or a beam shape of transmit light emitted toward the environment.

In various embodiments, the detector devices may have a detection area 414 that is larger than a beam spot area of received light received at a surface of a respective detector device. In such scenarios, the sensor system 400 could be configured to provide super-resolution lidar imaging of the environment. In some examples, super-resolution imaging could help improve the geometric resolution of the detector devices 412. Additionally or alternatively, the super-resolution imaging could be based on sub-pixel image localization. In such scenarios, sub-pixel image localization could help achieve arbitrary precisions that can be better than the dimensions of a single detector device pixel.

IV. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

In some examples, the vehicle 500 may include one or more sensor systems 502, 504, 506, 508, 510, and 512. In some embodiments, sensor systems 502, 504, 506, 508, 510 and/or 512 could include optical transmitter module 100 and/or sensor system 400 as illustrated and described in relation to FIGS. 1 and 3. In other words, devices and systems described elsewhere herein could be coupled to the vehicle 500 and/or could be utilized in conjunction with various operations of the vehicle 500. As an example, the optical transmitter module 100 and/or sensor system 400 could be utilized in self-driving or other types of navigation, planning, perception, and/or mapping operations of the vehicle 500.

In some examples, the one or more devices or systems could be disposed in various locations on the vehicle 500 and could have fields of view that correspond to internal and/or external environments of the vehicle 500.

While the one or more sensor systems 502, 504, 506, 508, 510, and 512 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

The one or more sensor systems 502, 504, 506, 508, 510, and/or 512 could include other lidar sensors. For example, the other lidar sensors could include a plurality of light-emitter devices arranged over a range of angles with respect to a given plane (e.g., the x-y plane). For example, one or more of the sensor systems 502, 504, 506, 508, 510, and/or 512 may be configured to rotate or pivot about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, 510, and/or 512 may be configured to provide respective point cloud information that may relate to physical objects within the environment of the vehicle 500. While vehicle 500 and sensor systems 502, 504, 506, 508, 510, and 512 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

In some embodiments, the one or more sensor systems 502, 504, 506, 508, 510, and/or 512 could include image sensors. For example, vehicle 500 could include a camera system that includes an image sensor configured to provide images of a field of view. In various examples, the image sensor may include a plurality of detector elements.

V. Example Methods

Figure 6:
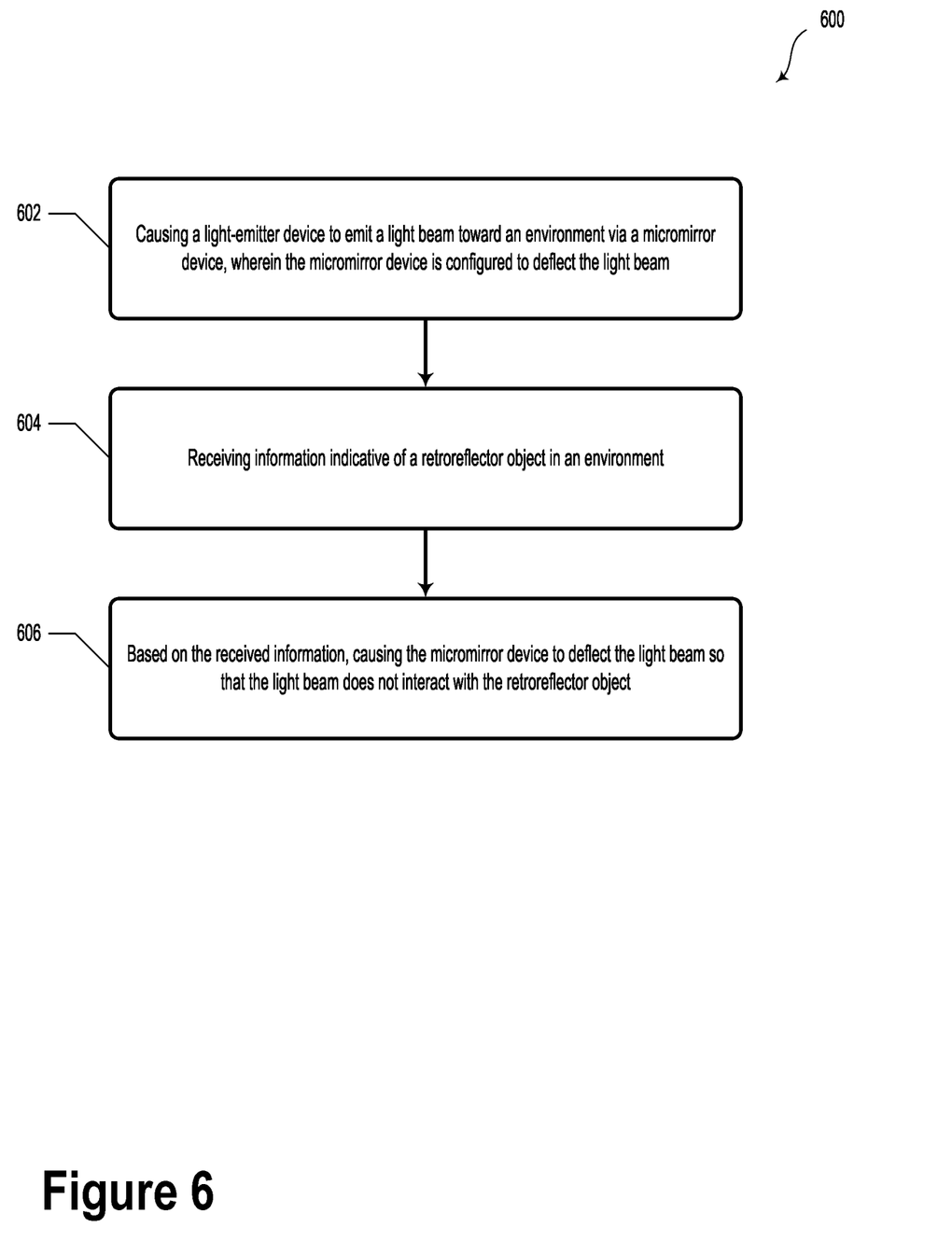
FIG. 6 illustrates a method, according to an example embodiment.

FIG. 6 illustrates a method 600, according to an example embodiment. While method 600 illustrates several blocks of a method of manufacture, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 600 may be carried out so as to form the optical transmitter module 100 and/or sensor system 400, as illustrated and described in reference to FIGS. 1 and 4, respectively.

Block 602 includes causing a light-emitter device (e.g., light-emitter device 110) to emit a light beam (e.g., light beam 112) toward a micromirror device (e.g., micromirror device 120). The micromirror device is configured to deflect the light beam toward an environment (e.g., environment 10) along a transmit axis (e.g., first transmit axis 126).

In some examples, the micromirror device could include a microoptoelectromechanical system (MOEMS) device (e.g., MOEMS device 124).

Block 604 includes receiving information indicative of a retroreflector object (e.g., retroreflector object 14) in the environment.

Block 606 includes, based on the received information, causing the micromirror device to adjust the transmit axis of the light beam so as to not interact with the retroreflector object. As an example, the micromirror device could adjust the transmit axis of the light beam so as to direct the light beam along second transmit axis 128.

In some example embodiments, method 600 could include causing a base (e.g., base 140) that may rotate or pivot about a first axis so as to sweep the transmit axis and/or the deflected light beams about an azimuth range.

In various examples, the micromirror device could be configured to dynamically adjust the transmit axis so as to reduce or minimize light that interacts with the retroreflector object.

In yet further embodiments, receiving information indicative of the retroreflector object in the environment could include receiving at least one of: point cloud information (e.g., point cloud information 162), retroreflector object map information (e.g., retroreflector object map information 164), or prior return information (e.g., prior return information 166).

In some examples, causing the micromirror device to adjust the transmit axis of the light beam so as to not interact with the retroreflector object could include redirecting the transmit axis toward a beam dump (e.g., beam dump 130).

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical transmitter module, comprising:
at least one light-emitter device, wherein the at least one light-emitter device comprises light-emitter devices arranged in a 1-dimensional array, and wherein the light-emitter devices are disposed along a shared light-emitter axis;
a plurality of micromirror devices optically-coupled to the light-emitter device, wherein the micromirror devices are arranged in a 1-dimensional array, wherein the micromirror devices are disposed along a shared micromirror axis, wherein the shared light-emitter axis and the shared micromirror axis are parallel, and wherein the light-emitter device is configured to emit respective light beams toward an environment via the micromirror devices, wherein the micromirror devices are configured to deflect the light beams; and
a controller having at least one processor and a memory, wherein the controller executes program instructions stored in the memory so as to carry out operations, wherein the operations comprise:
receiving information indicative of a retroreflector object in the environment; and
based on the received information, causing at least one micromirror device of the plurality of micromirror devices to deflect at least a portion of at least one light beam so that the portion of the at least one light beam does not interact with the retroreflector object.

2. The optical transmitter module of claim 1, wherein receiving information indicative of a retroreflector object in the environment comprises receiving at least one of: point cloud information, retroreflector object map information, or prior return information.

3. The optical transmitter module of claim 1, wherein the operation of causing the at least one micromirror device of the plurality of micromirror devices to deflect the portion of the at least one light beam comprises redirecting the portion of the at least one light beam toward a beam dump.

4. The optical transmitter module of claim 1, wherein the micromirror devices comprise microoptoelectromechanical system (MOEMS) devices.

5. The optical transmitter module of claim 1, wherein each of the micromirror devices comprise a steerable reflective surface configured to dynamically reduce or minimize light that interacts with the retroreflector object.

6. The optical transmitter module of claim 1, wherein plurality of micromirror devices are configured to operate at a refresh rate, wherein the refresh rate is greater than 1 kHz.

7. The optical transmitter module of claim 1, further comprising a transmit lens, wherein the transmit lens is configured to focus the respective light beams along a portion of the shared micromirror axis.

8. The optical transmitter module of claim 1, further comprising a base configured to rotate or pivot.

9. The optical transmitter module of claim 1, wherein the micromirror devices are configured to deflect the light beams toward a beam dump.

10. A sensor system, comprising:
an optical transmitter module, comprising:
at least one light-emitter device, wherein the at least one light-emitter device comprises light-emitter devices arranged in a 1-dimensional array, and wherein the light-emitter devices are disposed along a shared light-emitter axis; and
a plurality of micromirror devices optically-coupled to the light-emitter device, wherein the micromirror devices are arranged in a 1-dimensional array, wherein the micromirror devices are disposed along a shared micromirror axis, wherein the shared light-emitter axis and the shared micromirror axis are parallel, and wherein the light-emitter device is configured to emit respective light beams toward an environment via the micromirror devices, wherein the micromirror devices are configured to deflect the light beams;
an optical receiver module, comprising:
at least one detector device; and
a controller having at least one processor and a memory, wherein the controller executes program instructions stored in the memory so as to carry out operations, wherein the operations comprise:
causing at least one micromirror device of the plurality of micromirror devices to deflect at least a portion of at least one light beam.

11. The sensor system of claim 10, wherein the operations further comprise:
receiving, from the optical receiver module, information indicative of a retroreflector object in the environment, wherein causing the at least one micromirror device to deflect the at least one light beam is based on the received information, wherein the at least one light beam is deflected so that it does not interact with the retroreflector object.

12. The sensor system of claim 10, wherein causing the at least one micromirror device to deflect the at least a portion of the at least one light beam comprises adjusting a beam diameter or a beam shape of transmit light emitted toward the environment.

13. The sensor system of claim 12, wherein the detector device comprises a detection area that is larger than a beam spot area of received light received at a surface of a respective detector device.

14. The system of claim 10, wherein the micromirror devices are configured to deflect the light beams toward a beam dump.

15. A method comprising:
causing a light-emitter device to emit a light beam toward an environment along a transmit axis via a micromirror device, wherein the light-emitter device comprises light-emitter devices arranged in a 1-dimensional array, wherein the light-emitter devices are disposed along a shared light-emitter axis, and wherein the micromirror device comprises a plurality of micromirror devices arranged in a 1-dimensional array, wherein the micromirror devices are disposed along a shared micromirror axis, wherein the shared light-emitter axis and the shared micromirror axis are parallel, and wherein the micromirror device is configured to deflect the light beam;
receiving information indicative of a retroreflector object in the environment; and
based on the received information, causing at least one micromirror device of the plurality of micromirror devices to deflect the light beam so that the light beam does not interact with the retroreflector object.

16. The method of claim 15, further comprising sweeping the transmit axis about an azimuth range.

17. The method of claim 15, wherein the micromirror device comprises a microoptoelectromechanical system (MOEMS) device.

18. The method of claim 15, wherein receiving information indicative of the retroreflector object in the environment comprises receiving at least one of: point cloud information, retroreflector object map information, or prior return information.

19. The method of claim 15, wherein causing the at least one micromirror device of the plurality of micromirror devices to deflect the light beam so the light beam does not interact with the retroreflector object comprises deflecting the light beam toward a beam dump.

20. The method of claim 15, wherein causing the at least one micromirror device of the plurality of micromirror devices to deflect the light beam so the light beam does not interact with the retroreflector object comprises deflecting the light beam along a second transmit axis.

* * * * *